United States Patent [19]

Stickler

[11] 3,754,832

[45] Aug. 28, 1973

[54] DEVICE FOR DEBURRING PLASTIC PIPES
[76] Inventor: Charles F. Stickler, 57455 Poppy Rd., South Bend, Ind. 46619
[22] Filed: Dec. 1, 1970
[21] Appl. No.: 94,008

[52] U.S. Cl..................... 408/227, 408/211, 408/207
[51] Int. Cl............................................ B23d 79/08
[58] Field of Search................... 408/228, 227, 199, 408/207, 211; 146/52, 80

[56] References Cited
UNITED STATES PATENTS

| | | | |
|---|---|---|---|
| 3,550,482 | 12/1970 | Lee | 408/228 |
| 651,337 | 6/1900 | McDermott | 408/228 |
| 1,228,951 | 6/1917 | Morton | 408/227 |
| 469,354 | 2/1892 | Cook | 146/80 |

FOREIGN PATENTS OR APPLICATIONS

| | | | |
|---|---|---|---|
| 2,214 | 1/1895 | Great Britain | 408/199 |
| 561,582 | 10/1932 | Germany | 408/227 |
| 605,359 | 7/1948 | Great Britain | 408/207 |
| 238,578 | 11/1926 | Great Britain | 408/227 |

Primary Examiner—Andrew R. Juhasz
Assistant Examiner—Z. R. Bilinsky
Attorney—Eugene C. Knoblock et al.

[57] ABSTRACT

A pipe deburring tool having a rigid body with tapered inner and outer surfaces adapted to engage the end of a pipe to be deburred and having means defining sharp edges at said inner and outer surfaces to remove burrs from the end of the pipe upon relative rotation of contacting tool and pipe while substantially concentrically positioned.

3 Claims, 11 Drawing Figures

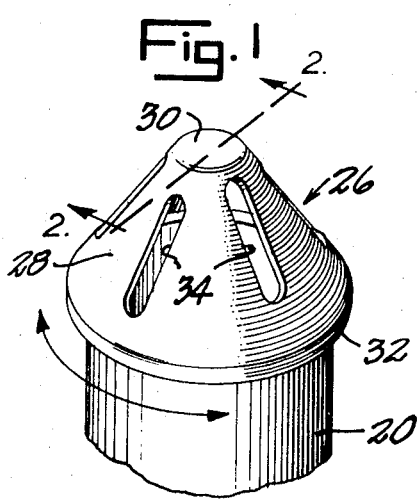
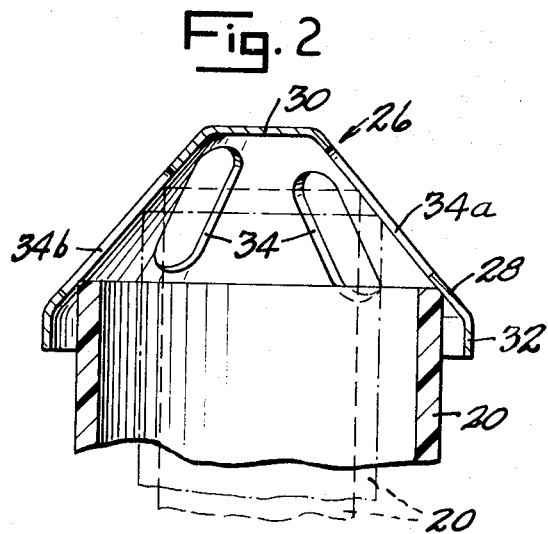
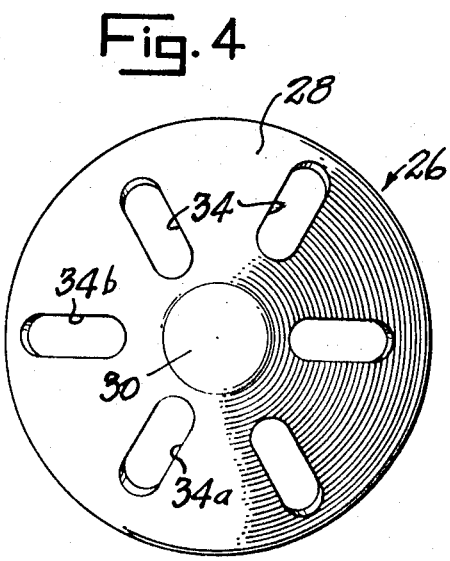
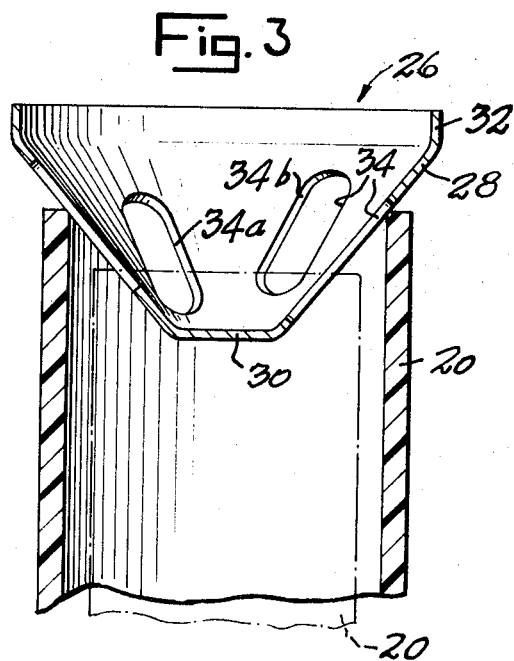
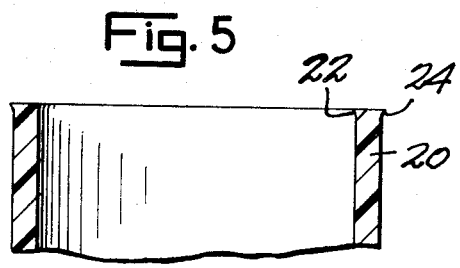
INVENTOR
CHARLES F. STICKLER

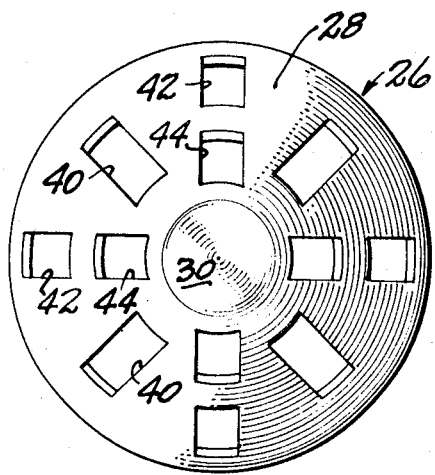
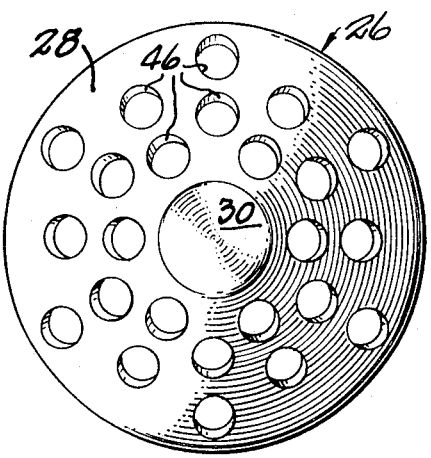
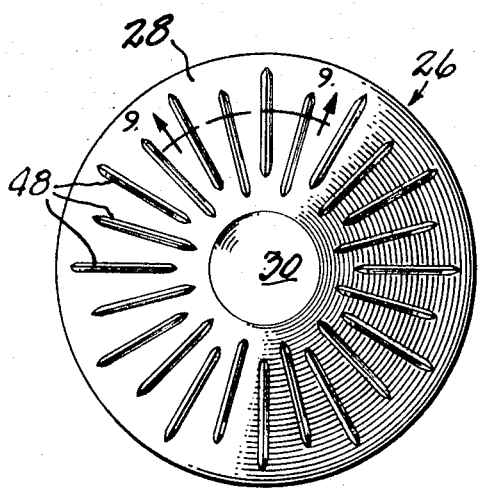
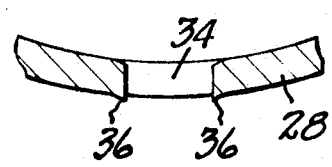
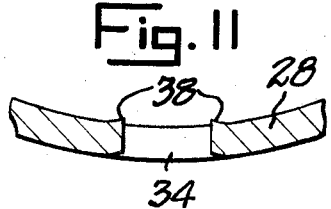
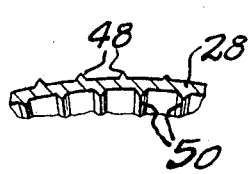
INVENTOR
CHARLES F. STICKLER

DEVICE FOR DEBURRING PLASTIC PIPES

This invention relates to a device for deburring plastic pipes.

Plastic pipes are being used increasingly in plumbing installations and industrial installations, and have various advantages for such uses. The pipes can be cut to desired length by pipe or tube cutters or by saws, and the pipe sections can be connected by means of pipe fittings of different types. Some pipe fittings are designed to fit externally around a pipe and others are designed to be inserted within a pipe. Almost all installations require the pipe to be cut and the cutting action, whether performed by a saw or a tube cutter, causes the formation of a burr or ridge at the cut end of the pipe. In some instances burrs are formed at the interior of the cut end, and in other instances at the exterior of the cut end. Such burrs must be removed to condition the pipe to receive or to mount a pipe fitting. This has been done heretofore by the use of a knife. Various disadvantages occur incident to the use of a knife or other conventional hand tool for the removal of burrs, which disadvantages include consumption of substantial amounts of time, and lack of uniformity of the burr removal operation at different points on the circumference of the edge of the pipe.

It is an object of the present invention to provide a pipe deburring means well suited for rapidly and uniformly removing burrs from both the inner and outer circumferential edges at the end of a pipe caused by cutting thereof.

A further object is to provide a tool which functions to simultaneously remove burrs at a plurality of points on the end of the pipe.

A further object is to provide a device of this character which is simple in construction, inexpensive, and capable of use without special skill or training.

A further object is to provide a tool of this character which is usable to quickly deburr pipes of any of a wide range of diameters and wall thicknesses.

Other objects will be apparent from the following specification.

In the drawings:

FIG. 1 is a perspective view illustrating the use of the device to remove burrs at the outer circumference of the end edge of a pipe.

FIG. 2 is a sectional view taken on line 2—2 of FIG. 1.

FIG. 3 is a sectional view similar to FIG. 2 and illustrating the use of the tool to remove burrs at the interior of the cut edge of a pipe.

FIG. 4 is an end view of the device.

FIG. 5 is a sectional view of the end of a pipe illustrating the occurrence of burrs thereon formed incident to cutting thereof.

FIG. 6 is an end view of a modified embodiment of the invention.

FIG. 7 is an end view of another modified embodiment of the invention.

FIG. 8 is an end view of still another embodiment of the invention.

FIG. 9 is a fragmentary sectional view taken on line 9—9 of FIG. 8.

FIG. 10 is an enlarged fragmentary detail sectional view of a portion of the tool.

FIG. 11 is an enlarged detail sectional view of another portion of the tool.

Referring to the drawings which illustrate the preferred embodiment of the invention, and particularly to FIGS. 1–5, 10 and 11, the numeral 20 designates a plastic pipe or tube of any conventional type used for plumbing or for industrial piping installations which is of rigid character and adapted to be connected with other pipe or tubing sections by means of fittings (not shown). Thus the pipe 20 may be formed of polyvinylchloride, known as PVC, or ABS polymer resins, namely a combination of styrene acrylonitrile with a butadiene acrylonitrile resin, or of polyethylene or of a phenolic, or of any other type. The invention may also be utilized with non-ferrous pipes and ferrous pipes. The cutting of pipes to length commonly causes the formation of burrs projecting from either the inner diameter of the pipe as shown at 22 in FIG. 5, or at the outer diameter thereof as shown at 24 in FIG. 5. Since the pipes, and particularly plastic pipes, are designed for use with fittings which fit sufficiently close to enable a seal to be provided by the application of a cement to the surface of the pipe and fitting to be connected, the occurrence of burrs such as 22 and 24 must be eliminated before the pipe and fitting can be connected. This has previously been accomplished in the art by using a dull knife or other hand tool applied to the pipe at the edge at which the burr occurs and so held incident to relative rotation of the pipe and tool during a number of revolutions. This is a time-consuming operation and does not produce a uniform deburring action.

My new deburring apparatus or tool preferably constitutes a sheet metal body member 26, although the tool may be formed by molding, casting or machining or any other procedure found desirable. The tool preferably has a frusto-conical or tapered hollow portion 28, a central portion 30 spanning the small diameter end of the tapered portion 28 which may be flat or of any other desired configuration, and a circular or tubular skirt portion 32 projecting from the large diameter end of the frusto-conical part 28.

Tool member 26 is preferably characterized by substantially uniform wall thickness throughout so that its outer contour and inner contour are substantially similar or complementary. The tapered portion 28 need not be frusto-conical, and instead may be of any configuration which is substantially circular on all cross sections normal to its axis. Thus, the member may be part ovate or substantially egg-shaped with skirt 32 projecting from the large diameter end part thereof.

The tapered portion 28 is provided with one or more apertures therein. In the form illustrated in FIGS. 1–4 are provided a plurality of apertures 34. Apertures 34 are elongated and preferably extend in a direction with their axial planes located radially of the tapered part 28. However, the apertures 34 may be of a spiral or helical shape and arrangement. The width of each aperture 34 may be of any selected dimension, and preferably will not be substantially less than three sixty-fourths of an inch wide. Each aperture may be of a width up to one-half inch or more. Each aperture 34 preferably extends for the major portion of the length of the tapered tool portion 28 in which it is formed. If desired, the apertures 34 may be staggered in arrangement as illustrated: that is, apertures 34a may terminate closer to the central portion 30 than apertures 34b, and remaining apertures 34b may terminate closer to the skirt portion 32 than apertures 34a. In the preferred form, the apertures 34a and 34b will be arranged in alternating relation.

Apertures 34 may be formed in any manner found suitable. Thus, in a sheet metal unit the apertures may be formed by saw kerfs or by punching. The apertured unit will retain its characteristic rigid nature whether stamped, cast or otherwise formed. Each aperture 34 will be characterized by sharp edges and preferably by burrs or ridges at either or both of the inner and outer surfaces of the tapered part 28. Thus, as illustrated in FIG. 10, selected apertures 34 may be characterized by burrs or ridges 36 projecting from the contour of the outer surface of the tapered part 28 as by punching outwardly to form and remove a slug. Other openings 34 may be characterized by burrs or ridges 38 projecting from the inner surface of the member 28 as shown in FIG. 11, as by punching inwardly to form and remove a slug.

The use of the tool is illustrated in FIGS. 1, 2 and 3. FIGS. 1 and 2 illustrate the use of the tool to remove exterior burrs 24 from the end of a pipe or tube 20. This is accomplished by applying the tool to fit around the end of the pipe with the inner surface of the tapered part 28 thereof or burrs 38 projecting inwardly therefrom engaging the outer burred end 24 of the pipe in a substantially concentric position. The tool is held against the end of the pipe in this position and relative rotation of the pipe and tool is produced while endwise pressure of the tool is exerted against the pipe. The engagement of the sharp edges of the apertures of the tool or of burrs 38 at such edges with the burred edge 24 of the pipe serves to cut away the burrs 24 of the pipe and may produce a slight bevel at the end of the pipe. The tool is readily gripped at either the tapered portion 28 or the skirt portion 32 during this operation, and removal of the burr 24 is accomplished rapidly and uniformly.

Removal of the interior pipe burr 22 is accomplished by inserting the small diameter end of the tool into the pipe 20, as illustrated in FIG. 3, in a substantially concentric position and rotating one of the tool or pipe relative to the other while applying endwise pressure. This operation can be accomplished readily by gripping the skirt portion 32 of the tool.

Both interior and exterior deburring operations require only a few turns of the tool through a slight angle, usually less than 180°. The burr portions 22 and 24 of the pipe which are cut or removed may be discharged through the apertures 34 so that the tool is substantially self cleaning.

One of the important characteristics of the tool is the fact that the taper thereof presents the edge burrs thereof to the taper end at substantially the same angle when deburring outwardly projecting burrs as shown in FIG. 2, and when deburring inwardly projecting burrs as shown in FIGS. 3. Also, it may be used to deburr pipes in a wide range of sizes or diameters. Thus, one form of tool having a skirt diameter of approximately 4 inches and a central diameter portion of approximately 1¼ inches may be effectively used to deburr pipes having outer diameters in the range from 1½ to 3½ inches. The manner in which pipes of different diameters are accommodated by the tool is illustrated in dotted lines in FIGS. 2 and 3.

An alternative embodiment of the invention wherein the body of the tool has the same configuration described above and including a tapered portion 28 and a central portion 30 is illustrated in FIG. 6. In this construction, elongated apertures 40 are formed in spaced relation in the tool part 28 with their longitudinal central planes radial to the tool. In portions of the tool wall 28 between apertures 40 are located pairs of apertures 42–44. The apertures are preferably so arranged that the outer ends of apertures 42 extend closer to the outer margin of the tool than do the outer ends of the apertures 40 and the inner ends of apertures 44 extend closer to the central portion 30 of the tool than do the inner ends of the apertures 40. The use of this embodiment of this invention is similar to that previously described and the arrangement of the apertures accommodates a wide range of pipe sizes.

Another embodiment of the invention is illustrated in FIG. 7 wherein the tool has a body of the same shape previously described and characterized by tapered part 28 and central part 30. In this construction a plurality of circular apertures 46 are formed within the tool wall 28 at various locations spaced at different distances from the inner part 30 and from the outer margin of the tool, and also staggered. The apertures are so arranged that any pipe of a size for application of the tool thereto will engage the edge of at least one of the apertures 46 to remove burrs from the pipe upon relative rotation of the pipe and tool.

Another embodiment of the invention is illustrated in FIGS. 8 and 9. In this embodiment the tool is characterized by the same body shape previously described, including the tapered wall 28 and central portion 30. In this construction the tapered wall 28 is characterized by elongated external ribs or ridges 48 and elongated internal ribs or ridges 50. The external ribs 48 are preferably of substantially similar shape and configuration and project substantially the same distance from the outer surface of the tool part 28. Similarly, each of the internal ribs 50 preferably is of the same shape and configuration and projects substantially the same distance from the inner surface of the tool part 28. The ribs 48 and 50 preferably extend lengthwise, that is from the larger diameter toward the small diameter end of the tool, and they may be straight or helical. The ribs may be staggered, as shown in FIG. 8, with some thereof terminating closer to the central portion than to the others, while the others terminate closer to the outer margin of the tool than do the first. The ribs 48 and 50 are preferably sharp at their crests or outer portions which engage the part of the pipe from which burrs are to be removed.

While a tool having a central body part 30 and the skirt 32 are preferred for purposes of strength, rigidity and ease of manipulation, such body configuration is not essential and only the tapered body part 28 with either apertures or ridges as previously described is required. Also, it will be understood that a circular cross section of the tapered part 28 is not essential if the deburring edges or ribs are positioned to engage the interior and exterior burred parts of a pipe when applied as seen in FIG. 2 or FIG. 3.

Also, while the tool illustrated is used manually, it may be mounted on a power driven shaft for powered rotation concentrically thereof.

While the preferred embodiments of the invention have been illustrated and described, it will be understood that changes in the construction may be made within the scope of the aPpended claims without departing from the spirit of the invention.

What I claim is:

1. A tool for deburring the ends of plastic tubes comprising a rigid substantially circular sheet metal body having tapered inner and outer surfaces, said tapered body portion having a plurality of apertures therein, spaced from each other and from the ends of the tapered surfaces and characterized by sharp edge burrs resulting from punch-formation of said apertures, the burrs at the edges of at least one aperture projecting substantially perpendicularly inwardly from said body inner surface as characterized by aperture formation by inward punching of a slug and the burrs at the edges of the remaining apertures projecting substantially perpendicularly outwardly from said body outer surface as characterized by aperture formation by outward punching of a slug, said apertures being of such size, shape and arrangement as to remove either exteriorly or interiorly projecting burrs of tubes of different diameters in a range from a large diameter less than the diameter of the large end of said body to a small diameter greater than the diameter of the small end of said body upon substantially concentric relative rotating contact of said tool and a tube.

2. A pipe deburring tool as defined in claim 1, wherein said apertures are elongated and extend between and are spaced from the large diameter and small diameter ends of said body.

3. A pipe deburring tool as defined in claim 1, wherein said body includes a central part spanning the small diameter end thereof.

* * * * *